United States Patent [19]
Pattison et al.

[11] Patent Number: 5,107,895
[45] Date of Patent: Apr. 28, 1992

[54] FLUID SPOKE INJECTOR SYSTEM

[76] Inventors: Larry K. Pattison; Richard L. Pattison, both of Box 336, Lemberg, Saskatchewan, Canada, S0A 2B0

[21] Appl. No.: 650,200

[22] Filed: Feb. 4, 1991

[51] Int. Cl.$^5$ .................................. A01C 23/02
[52] U.S. Cl. .................................. 137/625.11; 111/128
[58] Field of Search .............. 111/128, 118, 170, 740, 111/177, 90, 91; 403/224, 225, 226; 172/707, 711; 267/279; 157/625.11; 137/625.11, 625.16, 580

[56] References Cited

U.S. PATENT DOCUMENTS

| | | | |
|---|---|---|---|
| 2,308,137 | 1/1943 | White | 137/580 |
| 2,649,060 | 8/1953 | Hawkins et al. | 111/128 |
| 2,876,718 | 3/1959 | Vaughan | 111/128 X |
| 3,381,704 | 5/1968 | Richardson | 137/580 X |
| 4,034,686 | 7/1977 | Collins | 137/625.11 X |
| 4,178,860 | 12/1979 | Hines et al. | 137/625.11 X |
| 4,649,836 | 3/1987 | Overocker | 111/128 |
| 4,919,060 | 4/1990 | Cady | 111/128 |

*Primary Examiner*—John Rivell

[57] ABSTRACT

Disclosed herein is a device for introducing a fluid beneath the surface of the ground to ensure maximum utilization of such fluid especially in the growing of plants. The device comprises a rotating wheel assembly pivotally mounted by a shank to a tool-bar or implement through a side torque resistant mounting. The resistance to pivoting is controlled by a tension spring between the pivotable shank and the tool-bar mounting. Clamped to the lower end of the shank is an axle shaft upon which is mounted for rotation the wheel assembly. The wheel assembly includes a hub assembly formed of two identical hub portions and a hub sleeve which mounts injector spokes. The two hub portions have spokes which are integral with a circular rim which supports the injector spokes. The fluid is fed at low pressure into one end of the axle shaft through a flexible conduit. The fluid passes through a channel in the axle shaft and is then metered by a split sleeve distributor fixed to the axle shaft which functions as a valve when the wheel assembly rotates. The split sleeve distributor is so positioned as to permit a metered quantity of fluid only to the hub sleeve mounted spoke that has penetrated the soil. The injector spokes which penetrate the ground by means of a hardened pointed offset end, protect the outflow orifice from plugging. A countersink given to the outflow orifice also assists in preventing plugging of the orifice.

3 Claims, 2 Drawing Sheets

FLUID SPOKE INJECTOR SYSTEM

This invention relates to fluid handling apparatus and more particularly to apparatus for the injection of liquid fertilizers beneath the surface of the soil.

BACKGROUND OF INVENTION

Plants require several essential elements for growth. These elements are not always found in the proper amounts in the soil giving a marked decline in crop productivity. By the mid 20th century the agricultural land in most of the world had in a sense been mined of its fertility. Crops were harvested taking the essential elements out of the soil with none being returned.

Various types of material now called "commercial fertilizers" soon became available in an attempt to increase productivity. Liquid, gaseous and solid fertilizers are available each claiming advantages. The application of the fertilizer can take place at various stages such as treating the seed before planting, ground treatment before planting, while planting, post emergent and on the foliage.

As the various types of fertilizers developed so did the machines with which to apply them. Placing seaweed, manure, or other solid chemicals on the soil and cultivating it in gave way to placing the fertilizer where it would do the most good at the least cost. With the increased environmental awareness, spiraling energy costs and more emphasis on retaining crop residue on the soil surface to prevent erosion, applicants practical and efficient fertilizer apparatus could not be more timely. Various machines now in use place the fertilizer beneath soil close to the roots which is most desirable. However, many of these machines cannot apply the fertilizer at various stages of plant growth or to various types of soil applications. Plant damage, mechanical failure and plugging up of flow during ground penetration are all attendant problems of the majority of machines now in use.

A search of the prior art has revealed several U.S. Pat. Nos., those deemed most relevant being 4,649,836, 4,178,860, 2,876,718 and 2,649,060. U.S. Pat. No. "836" discloses a device for injecting liquid fertilizer into the soil by radial spoke injectors on a rotating hub but for distribution to the spokes uses a central disk formed with a socket adapted to hold a metering bushing slidable axially in the socket directing the fluid from the disk to a desired spoke. In contrast applicants device has a circumferentially compressible split sleeve for sealed distribution to a spoke having a specific ground engaging end and orifice. U.S. Pat. No. "860" also has tines or spokes which penetrate the ground surface to carry a liquid fertilizer controlled by a rotary distribution valve directly connected to a chain drive while applicants device has a stationary circumferentially compressible split sleeve distribution valve distributing liquid fertilizer to a spoke having a specific ground engaging end and orifice. U.S. Pat. No. "718" teaches both an axle bore and hub bore precision fit and lining up for fluid conduction and a spring loaded disk and axle with bore lining up with a hub bore for the fluid conduction. These however bear no resemblance to applicants split sleeve expansion fit valving arrangement nor is there taught applicants specific ground engaging tip. U.S. Pat. No. "060" teaches a main shaft bored to receive fluid, then conduit-transferred to another shaft by means of a cam actuated valving arrangement, to the ground engaging injection tubes. The injection tube nozzles are tapered to one side for ease of ground penetration. Applicants device in contrast as heretofore mentioned has a very simple single split sleeve distributor valve and a protected countersunk orifice for fluid transfer to the soil. It is abundantly clear from the above that applicants device avoids all known prior art since there cannot be found in a single reference or combination of references any suggestion that could be construed as pointing towards the herein disclosed instant invention.

SUMMARY OF THE INVENTION

This invention provides an apparatus for introducing soil treatment fluids into the ground, which apparatus includes several earth penetrating injector spokes mounted on a hub assembly rotatable on an axle. The injector spokes are supported by a rim which is held in a spaced relationship from the hub assembly by means of rim spokes. The hub assembly, spokes, rim and axle traverse the area to be fertilized by being attached to a tool-bar of a frame of a moving implement. The attaching means includes a shank which is clamped to one end of the axle. A torque resistant clamp is fixed to the tool-bar and is connected to the other end of the shank. A spring biasing means is attached to the shank at the axle end and to the tool-bar mounting means to ensure proper ground penetration of the injector spokes. The fluid is fed from a source to the clamped end of the axle, through a channel in the axle then distributed by a split sleeve distributor in the hub assembly to an injector spoke that has penetrated the ground.

In view of the above summary it is readily seen that it is a primary object of the above invention to provide a simple low maintenance split sleeve distributor to virtually eliminate mechanical failures.

It is a further object of this invention to provide a system that has low power requirements for operation.

It is a further object of this invention to provide a system that operates with a low pressure thus avoiding all the attendant problems of high pressure systems.

It is yet another object of the present invention to provide a system that will place the fertilizer in the most advantageous root zone area with the minimum of soil disturbance to increase nutrient up take.

It is a still further object of the instant invention to provide a torque resistant stabilizing mounting means.

Further objects and a fuller understanding of the instant invention will be realized when the disclosure is read in conjunction with the following accompanying drawings wherein like elements will be identified by like numerals.

DETAILED DESCRIPTION OF PREFERRED EMBODIMENT

Figure 1:
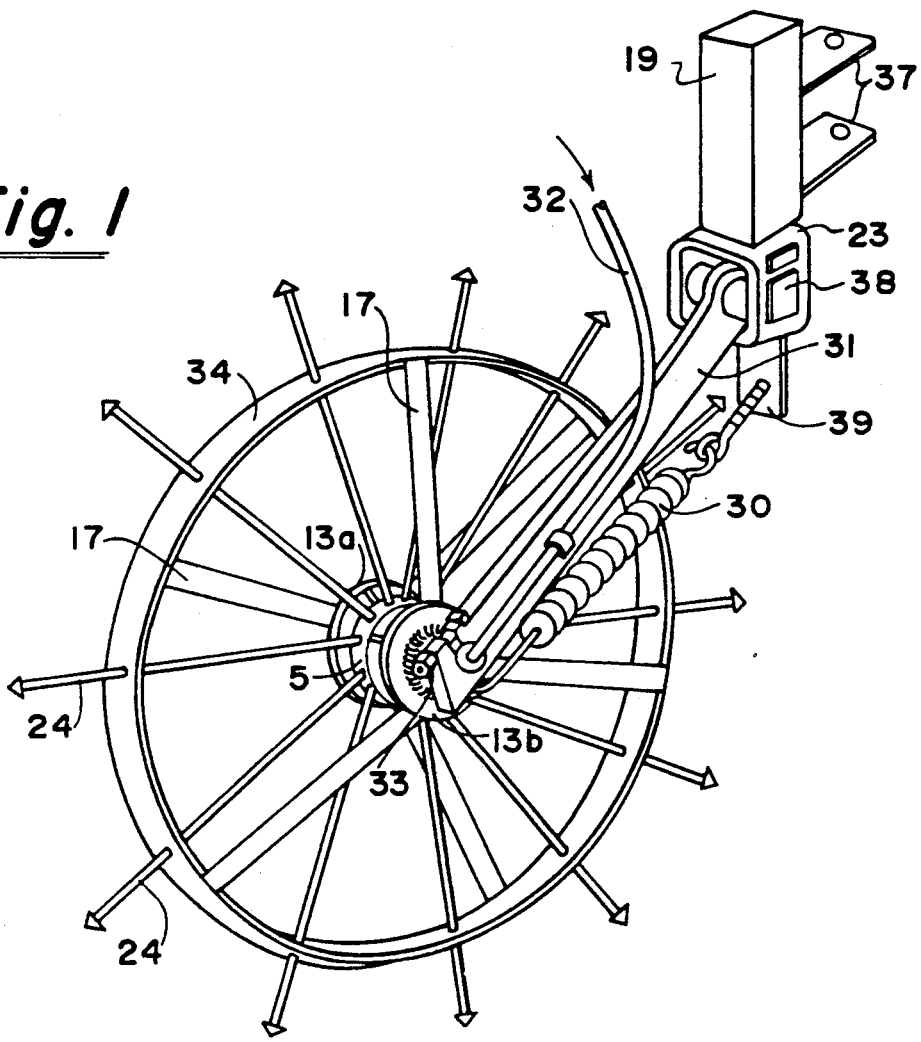
FIG. 1 is a perspective view of the fluid spoke injector system.

Referring now to the drawings there is shown in FIG. 1 a fluid spoke injector system adapted to be mounted on a tool-bar (not shown) so that a fluid may be transferred from a source by inlet hose 32 to the outlet 26 of an earth penetrating spoke 24 as the assembly rolls over the ground. The spoke injector system is mounted on the tool-bar (not shown) by a torque resistant coupling shown in detail in FIG. 5, having an outer torque tube 19 to be fastened to the tool-bar by fastening plates 37, and inner upper and lower guide rings 21 separated by resilient torque resistant torsion rubber 22 engaged by a shaft 20 with projections 41, integral with and extending uprightly from pivot support 23. Pivot pin 38 mounted in pivot support 23 pivotally supports shank 31 at its top end. The lower end of shank 31 clampingly engages axle shaft 1 rotatably supporting a hub assembly 35 which which carries injector spokes 24 supported by a rim 34 which is held in spaced relationship from said hub assembly 35 by hub spokes 17. The fluid for the system is fed from a source (not shown) through an inlet hose 32 to the axle shaft 1 through an inlet hose 32 to the axle shaft 1 through axle channel 15 to split sleeve gap 9 to hub sleeve 4 to connected injector spoke 24 to spoke orifice 26 which must have penetrated the ground.

Figure 2:
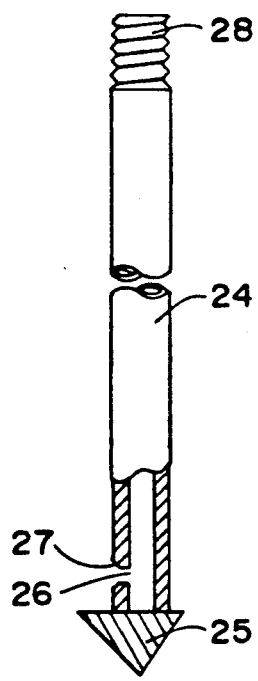
FIG. 2 is a partially sectioned elevation of a threadably connected type of injector spoke.
Figure 3:
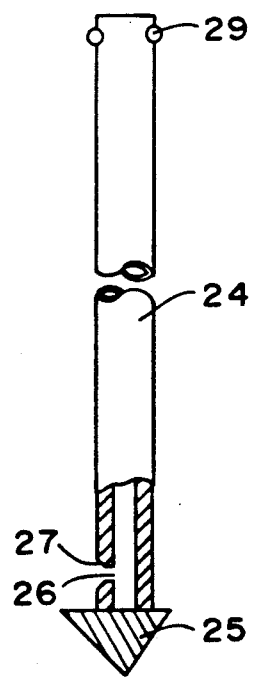
FIG. 3 is a partially sectioned elevation of an "O" ring connected type of injector spoke.

Referring now to FIGS. 2 and 3 we have spokes 24 both of which have an outlet orifice 26 with countersink 27 to prevent the soil from plugging up the orifice 26. Also to protect the orifice 26 from plugging we have a soil penetrating hardened metal point 25 which is mounted offset from the central axis. FIG. 2 shows a thread 28 for mounting the spoke 24 in the threads in boss 36 of hub sleeve 4. FIG. 3 teaches the provision of an "O" ring seal 29 to be placed in a bore hole in boss 36 which provides an alternative to the threaded connection. The spokes 24 after being mounted in hub sleeve 4 are fixed to rim 34 for retention and support.

Figure 4:
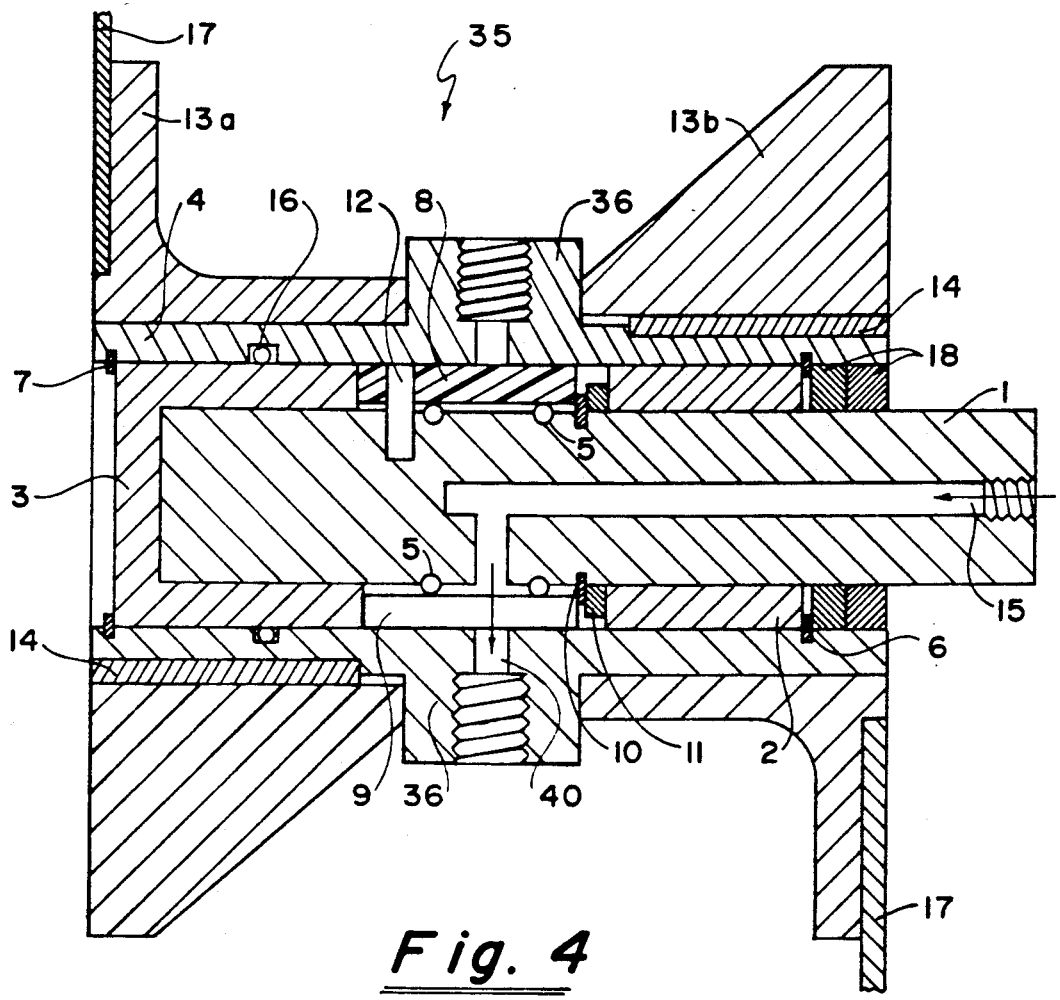
FIG. 4 is a fully sectioned hub assembly rotatably mounted on an axle with split sleeve distributor attached thereto.

Looking further at the drawings in FIG. 4 we have a hub assembly 35 comprising two identical hub portions 13a and 13b mounted on hub sleeve 4 in a circumjacent manner and keyed thereto by keys 14. Each hub portion carries hub spokes 17 to spatially support the rim 34. An axle shaft 1 is mounted within the bore of hub sleeve 4 by inner bushing 2 and outer end bushing 3 so that the hub sleeve 4 can rotate relative to the bushings and the bushings can rotate relative to axle shaft 1. This permits the hub assembly with rim 34 and injector spokes 24 to rotate about the fixed axle shaft 1.

The hub sleeve 4 has formed thereon bosses 36 which may have a threaded bore or a plain bore to receive injector spokes 24. The bore in the boss 36 is connected to the inner bore of hub sleeve 4 by a channel 40. The outer end bushing 3 is held in place axially by an outer end snap ring 7 and is sealed relative to the hub sleeve 4 by fluid sealing "O" ring 16. The inner bushing 2 is located axially by center snap ring 10 with wear ring 11 and inner end snap ring 6. Axially outwardly from inner end snap ring 6 are two fluid seals 18. A hose 32 carries fluid from a source at a low pressure of 20-40 p.s.i. to a threaded inlet in axle shaft 1 which is the beginning of channel 15 which extends basically along the central axis then turns at right angles to exit from the axle shaft 1. Between outer end bushing 3 and inner bushing 2 is a split sleeve distributor 8 fastened to the stationary axle shaft 1 by dowl pin 12. Split sleeve distributor 8 has an outside diameter slightly larger than the bore of hub sleeve 4 and an inside diameter larger than that of axle shaft 1, this provides a sealing expansive fit easily accomodated by a slight closing of the split sleeve gap 9. The sleeve gap 9 provides a pathway for the fluid from channel 15 of axle shaft 1 to the boss channel 40 and on out to injector spokes 24. The split sleeve distributor 8 is so positioned that it allows fluid to be conveyed only to an injector spoke that has penetrated the ground. The split sleeve distributor 8 is preferably made of a TEFLON ® base material and may be assisted in its sealing function by expansion "O" rings 5 fitted in grooves in axle shaft 1 or in the split sleeve distributor 8.

Figure 5:
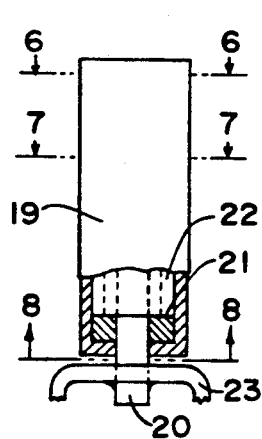
FIG. 5 is a partially sectioned view of the torque resistant tool-bar attaching means.

FIG. 5 as previously described refers to a torque resistant coupling with torque tube 19 housing therein upper and lower guide rings 21 separated by torsion rubber 22 which is engaged by shaft 20 having projections 41, to resist a torque movement of pivot support 23 to which shaft 20 is integrally attached.

Figure 6:
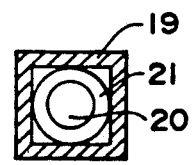
FIG. 6 is a view taken in the direction of the cutting plane 6—6 in FIG. 5.

FIG. 6 is a view of cutting plane 6—6 in FIG. 5 to indicate the shaft 20, upper inner guide ring 21 and outer torque tube 19.

Figure 7:
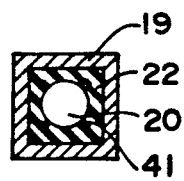
FIG. 7 is a view taken in the direction of the cutting plane 7—7 in FIG. 5.

FIG. 7 is a view of cutting plane 7—7 to indicate the shaft 20 with projections 41 engaging the torsion rubber 22.

Figures 8, 9:
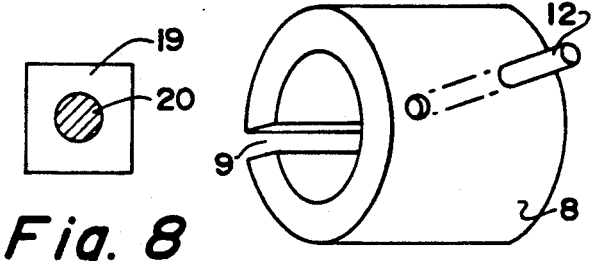
FIG. 8 is a view taken in the direction of the cutting plane 8—8 in FIG. 5.
FIG. 9 is a perspective view of the split sleeve distributor with its axle securing pin.

FIG. 8 is a view between the pivot support 23 and torque tube 19.

FIG. 9 is a perspective view of split sleeve distributor 8 with its mounting pin 12 in removed position. The split sleeve gap 9 allows the circular sleeve to be slightly compressed before installation thereby giving an expansive sealing force between it and the inner bore of hub sleeve 4.

Operation

One or more spoke injector units are fastened to a tool-bar or implement which is subsequently passed over an area to be fertilized. These units operate in a rolling motion brought about by the injector spokes 24 engaging and penetrating the surface of the ground. The injector spokes 24 are normally spaced at 8" intervals about rim 34, can have row widths from 6-24" and normally penetrate 3-4" of soil depending on the tension of spring 30. A tank or source of fertilizer fluid is transported along with the system. Each spoke injector unit is fed by a hose 32 with fluid from the source under a pressure of approximately 20-40 p.s.i. The fluid enters the axle shaft 1 passes through the split sleeve distributor 8 where a proper amount of fluid is metered to an injector spoke 24 that has penetrated the soil.

What we claim is:

1. In an improved fluid distribution system for the metering and distribution of a fluid, the improvement comprising a rotor means having a bore, a stator means having integral fluid inlet means and a conveying channel sealingly mounted in said bore, a split sleeve distributor fixedly mounted on said stator, said split sleeve distributor being expanded in said bore to form a seal between said stator and said rotor except at a gap in said split sleeve distributor, fluid outlet passage means in said rotor whereby fluid from a source is fed to said stator, it is conveyed to said split sleeve distributor which meters and distributes it to a desired fluid outlet passage means.

2. In an improved fluid distribution system as claimed in claim 1 wherein said split sleeve distributor is outwardly expanded for a sealing relationship with said bore by "O" rings mounted on said stator and engaging the inner surface of said split sleeve distributor.

3. In an improved fluid distribution system as claimed in claim 1 wherein said split sleeve distributor has an initial external diameter greater than the inner diameter of said bore.

* * * * *